United States Patent [19]

Kralick

[11] Patent Number: 5,021,697
[45] Date of Patent: Jun. 4, 1991

[54] AUXILIARY BEARING DESIGN FOR ACTIVE MAGNETIC BEARINGS

[75] Inventor: James H. Kralick, Latham, N.Y.

[73] Assignee: Mechanical Technology Incorporated, Latham, N.Y.

[21] Appl. No.: 529,877

[22] Filed: May 24, 1990

[51] Int. Cl.$^5$ .......................... H02K 5/16; F16C 39/06
[52] U.S. Cl. ..................................... 310/90.5; 310/90; 384/624
[58] Field of Search .......................... 310/74, 90, 90.5; 384/446, 102, 624

[56] References Cited

U.S. PATENT DOCUMENTS

| 4,180,946 | 1/1980 | Heijkenskjold et al. | 310/90.5 |
| 4,683,111 | 7/1987 | Helm et al. | 384/446 |
| 4,942,321 | 7/1990 | Kanemitsu | 310/90.5 |

Primary Examiner—Steven L. Stephan
Assistant Examiner—D. L. Rebsch
Attorney, Agent, or Firm—Joseph V. Claeys; Joseph C. Sullivan

[57] ABSTRACT

A magnetic bearing rotating structure includes a rotor magnetically supported in a housing by a magnetic bearing. A back-up bearing arrangement is used to resist impact on the rotor, including a fixed bumper bearing for resisting a sudden impact, and an auxiliary bearing for rotatably supporting the rotor while the magnetic bearing resumes operation.

16 Claims, 5 Drawing Sheets

AUXILIARY BEARING DESIGN FOR ACTIVE MAGNETIC BEARINGS

This invention was made with Government support under N00024-88-C-2219 awarded by the Department of the Navy. The Government has certain rights in this invention.

BACKGROUND OF THE INVENTION

1. Field of Invention

This invention pertains to rotating structures supported by magnetic bearings, and more particularly, a structure with auxiliary bearings constructed and arranged to permit the structure to withstand excessive radial and axial shocks.

2. Background of the Invention

High speed rotating structures such as various motors, generators, turbines, and so on, are provided with bearings interfacing between the stationary and rotating members. These bearings must be able to function reliably, without overheating.

Unlike other bearing support systems, magnetic bearings are limited in load capacity by the magnetic properties of the bearing materials. Typical magnetic journal bearing will support loads of 40 to 80 pounds per square inch of projected area, depending upon rotor and stator materials. In contrast, oil bearings are designed for loads of 100 to 250 pounds per square inch of projected area and can carry considerably higher loads for short periods of operation.

The magnetic bearing performs two functions, i.e., to levitate and statically support the rotor in a magnetic field and to provide stiffness and damping properties to control the position of the shaft when subjected to any dynamic forces. The static or support stiffness is generally 10 to 20 times the magnitude of the dynamic stiffness. The dynamic stiffness is further reduced at running speed to minimize the force transmission to the bearing pedestal from rotating unbalance, resulting in a relatively soft dynamic stiffness. The disadvantage of the soft suspension is the limited ability to absorb shock loading which could bottom out the bearing. There is a need, therefore, to provide a backup or catcher bearing to prevent contact of the rotor and stator in the event of high shock load. The backup bearing also provides protection of the magnetic bearing in the event of the bearing circuitry and/or winding failures and prevents contact of the magnetic bearing when the machine is not running.

The generally accepted procedure for incorporating this backup or catcher bearing into the magnetic bearing design is to mount the outer race of a rolling element bearing, typically a deep groove bearing into a rigid housing which holds the center of this backup bearing concentric to the rotating center line of the rotor. There is a machined clearance between the inner race of the backup bearing and the outer diameter of the rotor. This clearance is smaller then the air gap in the magnetic bearing. When the magnetic bearing is supporting the rotor, it holds the rotor within this clearance so that during normal operation, the rotor never touches the backup bearing. During failure of the magnetic bearing or during periods of high shock loading, the rotor is caught and/or supported by the back bearing. This concept is shown in FIG. 1, wherein a rotating structure 10 includes a housing 12 for supporting a rotor 14 by using magnetic bearing. The magnetic bearing consists of a bearing stator 16 mounted on the housing 12 and a bearing rotor 18 mounted on the rotor 14. In normal operation the magnetic bearing maintains the rotor at a nominal radial gap 22 between the bearing stator and the bearing rotor. In case of a failure of the magnetic rotor, or in response to a radial shock, the rotor may crash into the stator. In order to prevent such an occurrence, a conventional static bearing 24 is mounted on the housing as a backup bearing. For example the bearing 24 may be a deep groove roller bearing with an outer race mounted on the housing 12. The bearing 24 is sized so that there is a radial gap 26 between the bearing 24 and rotor 14 which is smaller than the gap 22 between the stator bearing and the rotor bearing.

FIGS. 2 and 2A show another rotating structure designed to take a thrust load. This structure 30 includes a housing 32 which supports a rotor 32 with an axial thrust runner 34. The structure is also provided with a radial magnetic bearing consisting of a journal stator 36 mounted in the housing and a journal rotor 38 mounted on the rotor, separated by a radial gap 40. A second magnetic bearing is also provided which includes thrust stators 42, 44 mounted in the housing 32. The thrust stator 42 and runner 34 are separated by an axial thrust gap 46. In order to prevent damage caused by the failure of a magnetic bearing, the structure is also provided with a pair of conventional backup bearings 50, 52 mounted securely in the housing 32 and separated by a preloading shim 54. The bearings are spaced by a radial gap 56 from the rotor, which gap is smaller than the journal gap 40, and by an axial gap 58 from a shoulder 60 formed on rotor 32. Axial gap 58 is smaller than the thrust gap 46.

However the magnetic bearing structures described above were limited in weight, diameter and speed because by ability of backup bearings to handle the rotor in case of a failure.

OBJECTIVES AND SUMMARY OF THE INVENTION

In view of the above disadvantages of the prior art, it is an objective of the present invention to provide a rotating magnetic bearing structure which can sustain excessive radial and/or thrust shock loads without sustaining any damage.

A further objective is to provide a magnetic bearing rotating structure with dynamic backup bearing means which adjusts itself and compensates automatically for axial or radial shock loads.

A further objective is to provide an auxiliary arrangement suitable for rotors having larger weight, or operating speeds than achieved previously. Other objectives and advantages of the invention shall become apparent from the following description. Briefly, a rotating apparatus comprising a housing, a rotor, magnetic bearing means for rotatably supporting said rotor in said housing, and backup bearing means for preventing contact between said rotor and said magnetic bearing means, said backup bearing means including bumper bearing means for resisting an impact on said rotor; and auxiliary bearing means for supporting said rotor in the absence of said impact. Thus, during the impact, the rotor is supported temporarily by the bumper bearing means. Immediately after the impact is removed, the rotor is pushed away from the bumper bearing means and is supported by the auxiliary bearing means until normal operation is resumed. In this manner the bumper bearing can be made of high impact materials to resist very high loads for a short time periods. The auxiliary means supports the rotor at other times.

DETAILED DESCRIPTION OF THE INVENTION

Figure 3:
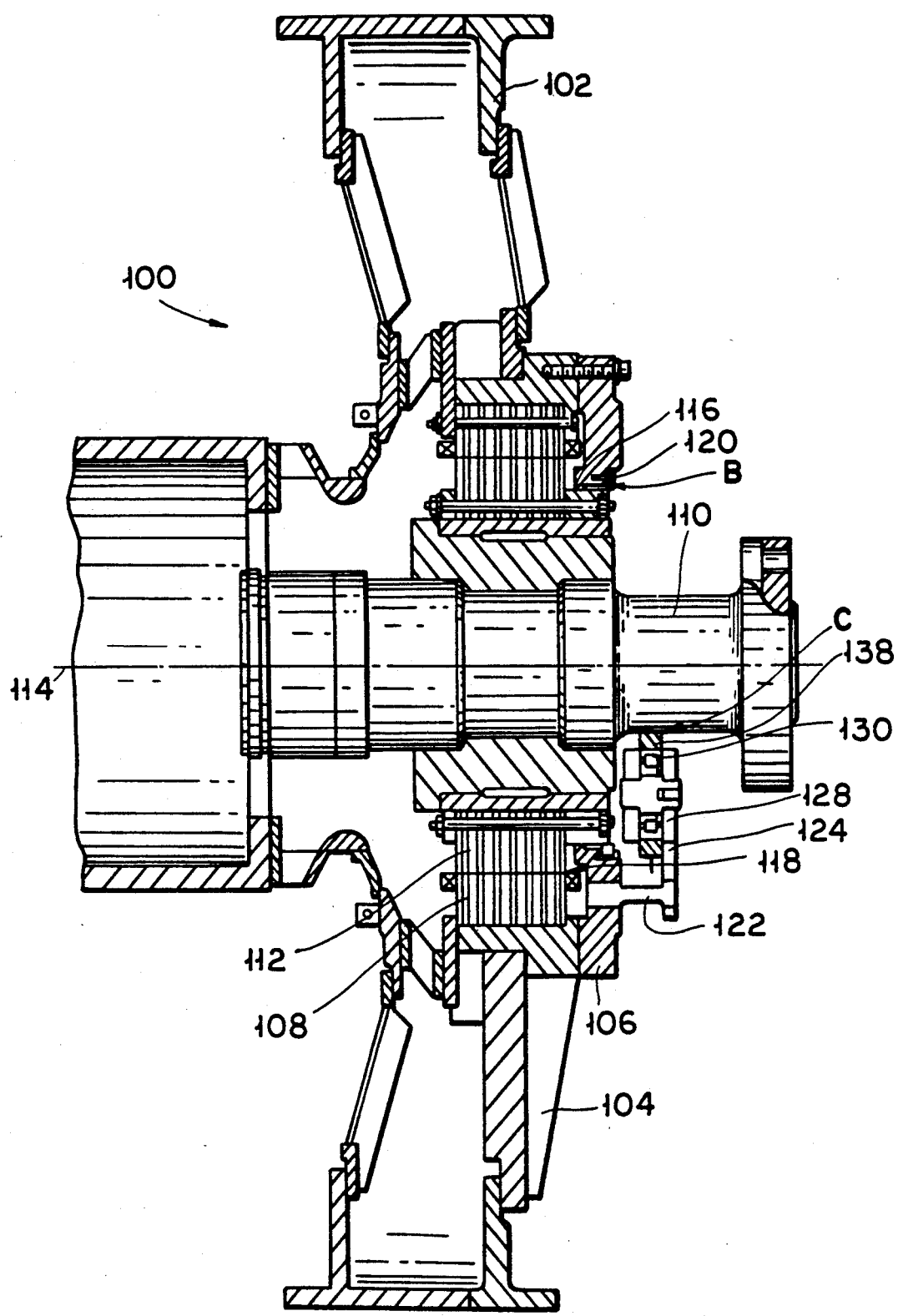
FIG. 3 shows a side-sectional view of a rotating structure with a magnetic bearing constructed in accordance with this invention.
Figure 3A:
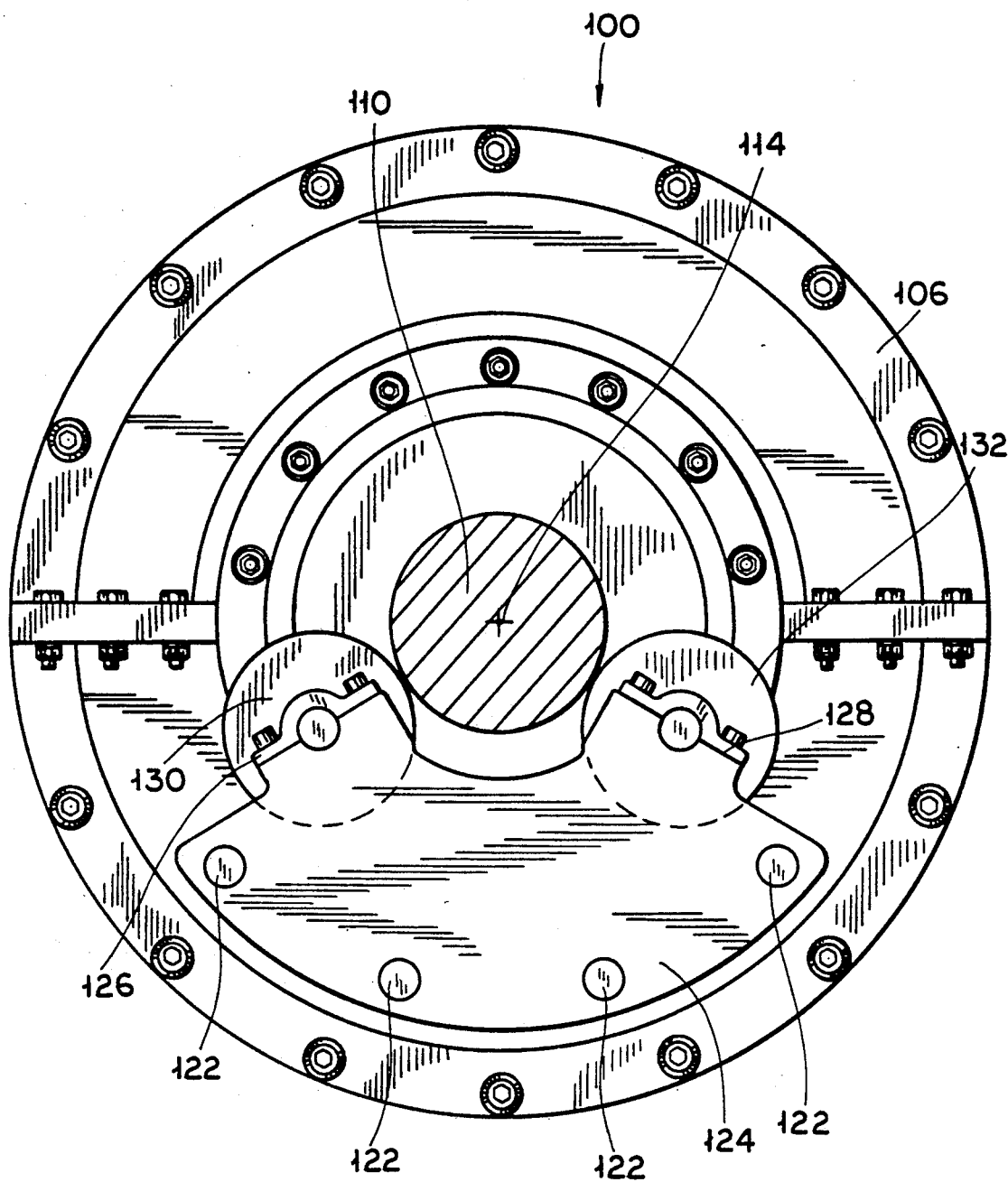
FIG. 3A shows an end view of the structure of FIG. 3.

For illustrative purposes, FIGS. 3 and 3A, show a turbine generator 100 incorporating the teachings of the present invention, it being understood that these teachings are equally applicable to other rotating machinery. The generator includes a housing 102. Extending radially inwardly from the housing is split bearing bracket 104 supporting a bearing shell 106. Inside bearing shell 106 there is disposed an annular magnetic bearing stator 108. A rotor 110 extends axially through the bearing shell and supports a magnetic bearing rotor 112 cooperating with the bearing stator 108 to allow the rotor to revolve around axis 114. A magnetic probe 116 is disposed in the bearing shell as shown, to monitor the position of the bearing rotor in the usual manner for magnetic bearings. The radial distance or gap between the bearing stator and the bearing rotor is shown by numeral 118.

In accordance with this invention, there is provided a bumper bearing 120 disposed concentrically with the nominal axis of rotor 110 in the rigid bearing shell 106. Bumper bearing 120 is disposed axially outwardly of probe 116. Preferably bearing 120 is a solid journal cylinder such as a type Garlock DU bearing made by the Garlock Bearing Inc., N.J., 08086. This type of bearing resists axial shocks impacts very well. Under normal operating conditions, the rotor 110 is disposed at a radial distance or gap B from the bumper bearing 120.

Also mounted on bearing shell 106 is a plurality of flexible rods 122 (four being shown in FIG. 3A) extending in parallel with axis 114. Mounted on rods 122 is a flexure plate 124. The rods are made of a high strength flexible steel such as 17/4 PH steel. Plate 124 may be made of the same material as the rods 122 so that the rods can be welded easily to the plate. However the plate 124 and rods 122 may also be made of different materials.

Plate 124 includes two bearing supports 126, 128 for supporting two auxiliary bearings 130, 132 respectively. More particularly, each auxiliary bearing is disposed axially outwardly of the bumper bearing and has an eccentric mounting shaft 134 engaged by the bearing supports 126, 128. Auxiliary bearings 130, 132 are preferably cylindrical roller bearings designed to support the rotor 110 for extended time periods even while the rotor is turning at high speed. Preferably, bearings 130, 132 are grease-packed and have an outer race 136 with shrunken crowned sleeve 138. The size of this sleeve determines the speed of rotation of the bearings 130, 132 when they are in contact with the rotor 114. Under normal operating conditions, the radial distance or gap C between the rotor 110 and the auxiliary bearings may be set by adjusting the position of the corresponding eccentric mounting shaft 134 within bearing supports 126, 128.

Preferably, gap C is in the range of 0.005-0.008", gap B is about 0.015-0.020" and gap A is in order of about 0.030". If the rotor accelerates or decelerates, for example in response to a sudden change in its load, it may experience a short-term radial shock or impact. A radial impact on the rotor may also result if the main magnetic bearing fails. In the present invention, in response to such an impact, the rotor starts moving away from its nominal axis 114 and it first comes into contact with auxiliary bearings 130, 132. These bearings are not intended to withstand the impact but they are mounted flexibly so that under the impact the rods 122 bend allowing bearings 130, 132 to move radially away from axis 114 together with the rotor 104. The rotor continues its radial movement until it contacts bumper bearing 120. The bumper bearing 120 is fixed to the shell 106 and is intended to resist the radial impact and contain the rotor for a short time period. After the impact stops, the rods 122 bend back to their normal position pushing bearings 130, 132 radially inward and thereby lifting the rotor off bumper bearing 120. The auxiliary bearings 130, 132 support the rotor while the rotor continues to turn until normal conditions are established, i.e. the main magnetic bearing returns the rotor to its nominal position, or the rotor is shut down.

Figure 1:
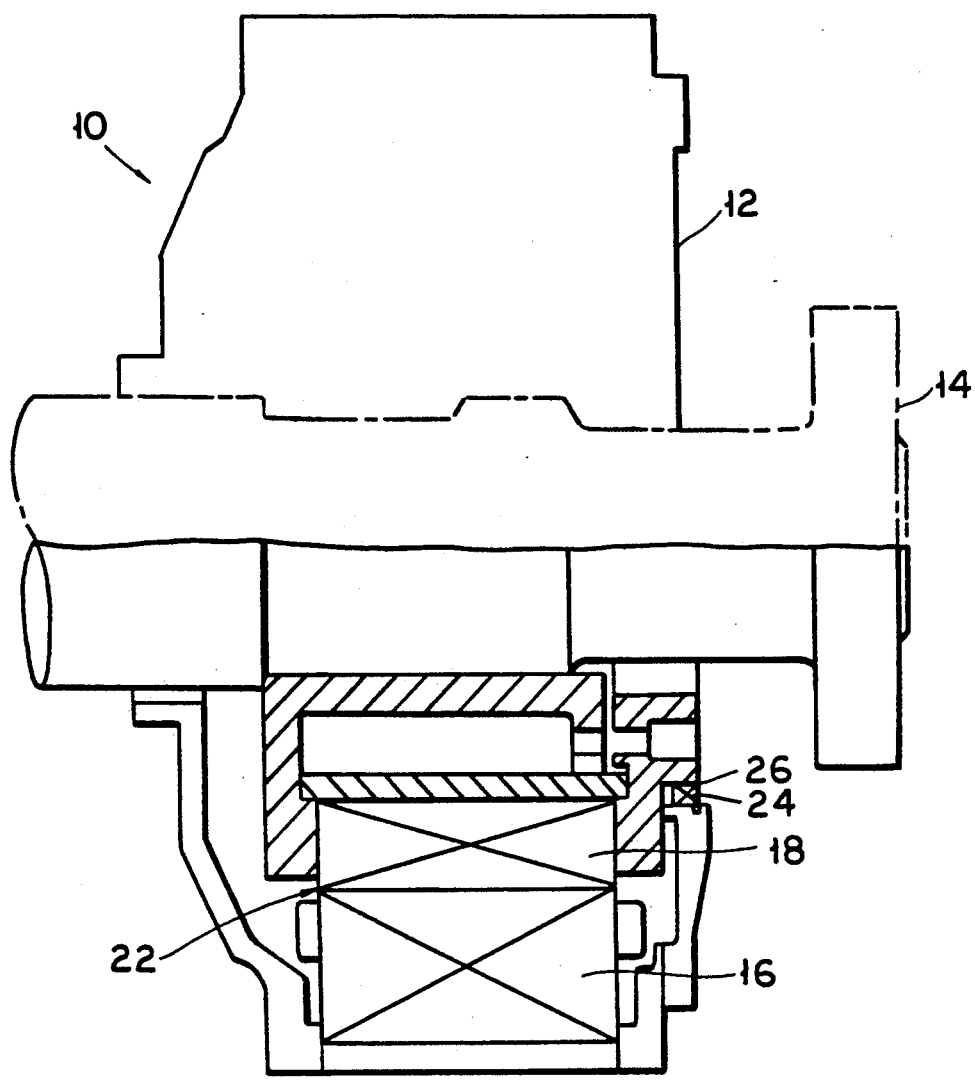
FIG. 1 shows a side-sectional view of a prior art rotating structure having a magnetic bearing.
Figure 2:
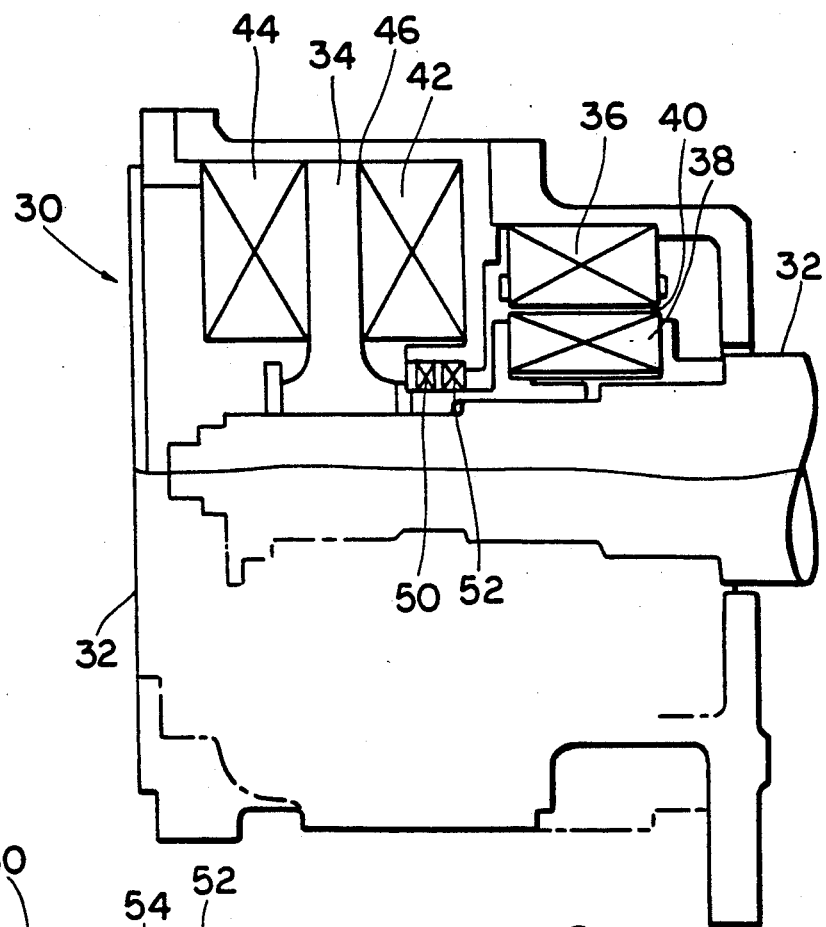
FIG. 2 shows a side-sectional view of another prior art rotating structure having a magnetic bearing.
Figure 2A:
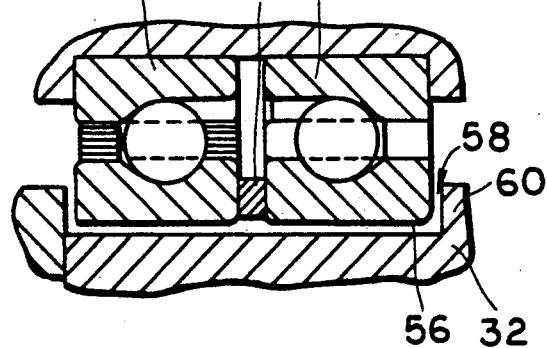
FIG. 2A shows an enlarged section of FIG. 2.
Figure 4:
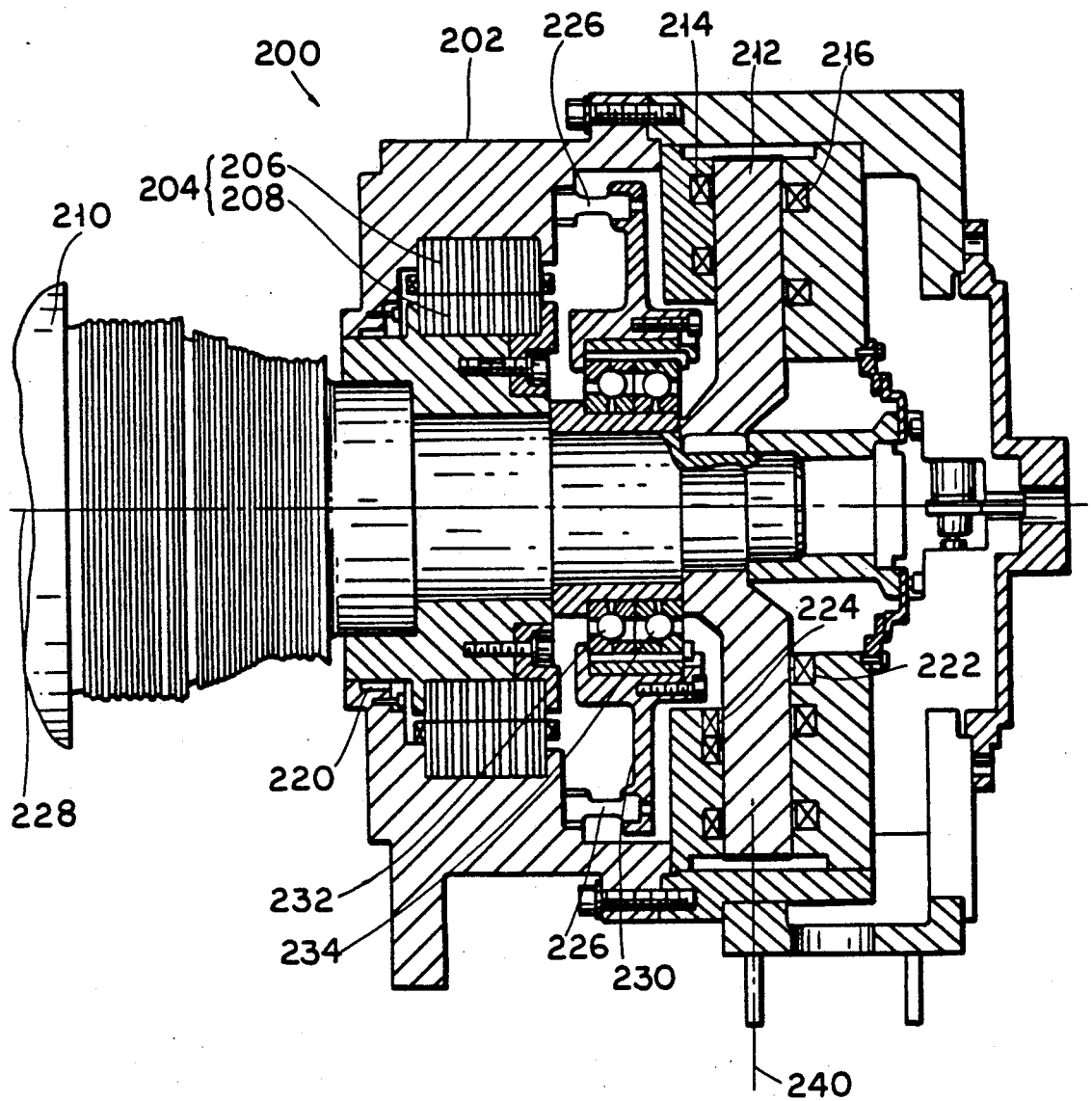
FIG. 4 shows a side-sectional view of an alternate embodiment of the invention.

As previously described in conjunction with FIGS. 2 and 2A, some rotating structures are subjected to significant thrust or axial impacts as well as radial impacts. For these types of impacts the bearing arrangement is shown in FIG. 4. This FIG. 4 shows a rotating structure 200 including a housing 202 with an axial magnetic bearing 204 including a radial bearing stator 206 and a radial bearing rotor 208. The radial bearing rotor 208 is mounted on a rotor 210.

Also mounted on rotor 210 is a thrust runner 212. The housing supports a pair of thrust stators 214, 216 and cooperates with the thrust runner 212 to form a thrust magnetic bearing.

In a manner similar to the one described in FIGS. 3A and 3B, the structure 200 also includes bumper bearings and auxiliary bearings. More particularly a radial bumper bearing 220 is mounted axially outwardly of the radial magnetic bearing, and two axial bumper bearings 222, 224 are provided, one on either side of runner 212 as shown.

Also mounted in housing 202 are a plurality of flexible rods 226 disposed radially around and extending in parallel with the axis 228. Secured to each rod 226 is a second flexible plate 230 extending radially. Rods 230 cooperate to support a pair of auxiliary bearings 232, 234 disposed concentrically around axis 228. Preferably the two bearings are spaced as shown in FIG. 2A.

The operation of the bearings of structure 200 is similar to the operation of the apparatus shown in FIGS. 3 and 3A. During normal operation, the rotor turns at high speed and is suspended by the radial magnetic bearings so that its axis of rotation substantially coincides with nominal axis 228. Furthermore, the rotor is positioned so that its runner is substantially aligned axially with a thrust axis 240. When the rotor 210 is subjected to a radial impact, the auxiliary bearings allowed to bend by radial flexure rods 226. The radial motion of the rotor 210 is constrained by the radial bumper bearing 220, and when this impact ceases the rotor 210 keeps running on auxiliary bearings 232, 234 until normal operation is resumed.

In response to an axial impact, the auxiliary bearings, which are in constant contact with runner 212 are allowed to bend substantially axially by axial flexure plate 228 until the runner comes into contact with and is restrained by one of the axial bumper bearings 222 or 224 depending on the direction of the thrust impact. After the thrust impact ceases, the rotor returns partially toward axis 240 to ride on auxiliary bearings 232, 234 until the thrust magnetic bearing resumes operation.

Obviously numerous modifications can be made to this invention without departing form the scope of the invention as defined in the appended claims.

I claim:

1. A rotating apparatus comprising:
   a housing;
   a rotor;
   magnetic bearing means for rotatably supporting said rotor in said housing;
   back-up bearing means for preventing contact between said rotor and said magnetic bearing means, said back-up bearing means including bumper bearing means for resisting an impact on said rotor; and auxiliary bearing means for supporting said rotor in the absence of said impact;
   wherein said auxiliary bearing means includes an auxiliary bearing and resilient bearing support means for supporting said auxiliary bearing, said resilient bearing support means bending in the presence of said impact to permit contact between said bumper bearing means and said rotor.

2. The rotating apparatus of claim 1 wherein said back-up bearing means includes radial back-up bearing means and axial bearing means.

3. A rotating apparatus comprising:
   a housing;
   a rotor;
   magnetic bearing means for rotatably supporting said rotor within said housing;
   bumper bearing means for supporting said rotor against an impact; and
   auxiliary bearing means, including an auxiliary bearing and a resilient bearing support means for attaching said auxiliary bearing to said housing, for supporting said rotor away from said bumper bearing means in the absence of said impact.

4. The apparatus of claim 3 wherein said bumper bearing means is axially spaced from said auxiliary bearing means.

5. The apparatus of claim 3 wherein said bumper bearing includes radial bumper bearing means for resisting a radial impact and axial bumper bearing means for resisting an axial impact.

6. The apparatus of claim 3 wherein said auxiliary bearing means includes radial auxiliary bearing means and axial auxiliary bearing means.

7. The apparatus of claim 3 wherein said bumper bearing means includes a bearing affixed to said housing.

8. A rotating apparatus comprising:
   a housing;
   a rotor;
   magnetic bearing means for rotatably supporting said rotor within said housing;
   bumper bearing means for supporting said rotor against an impact; and
   auxiliary bearing means for supporting said rotor in the absence of said impact;
   wherein said auxiliary bearing means includes an auxiliary bearing and resilient bearing support means for attaching said auxiliary bearing to said housing, said auxiliary bearing support means permitting said auxiliary bearing to move away from a preselected position in the presence of said impact to permit contact between said rotor and said bumper bearing means, said auxiliary bearing support means moving said auxiliary bearing to shift said rotor from said bumper bearing means when said impact ceases.

9. The apparatus of claim 8 wherein said auxiliary bearing is concentric with said rotor.

10. The apparatus of claim 8 wherein said auxiliary bearing has an axis radially spaced from said rotor.

11. A rotating apparatus comprising:
    a. a housing;
    b. a rotor;
    c. a magnetic bearing including bearing stator mounted on said housing and a bearing rotor mounted on said rotor at a nominal magnetic bearing spacing from said bearing stator;
    d. a bumper bearing fixedly mounted on said housing at a bumper bearing spacing from said rotor smaller than said magnetic bearing spacing;
    e. auxiliary bearing means disposed at an auxiliary bearing gap from said rotor; said auxiliary bearing gap being set between said bumper bearing spacing and said magnetic bearing spacing; and
    f. resilient means for supporting said auxiliary bearing means, said resilient means allowing said auxiliary bearing means to move from an original position with said rotor until said rotor contacts said bumper bearing means for resisting an impact on said rotor, said auxiliary bearing moving back to said original position with said rotor when said impact ceases.

12. The apparatus of claim 11 wherein said auxiliary bearing means includes a plurality of auxiliary bearings at the periphery of said rotor.

13. The apparatus of claim 12 wherein said resilient means includes a plurality of flexing rod means extending from said housing and a plate mounted on said on said rod means for supporting said auxiliary bearings.

14. The apparatus of claim 11 wherein said auxiliary bearing means includes an auxiliary bearing mounted concentrically with said rotor.

15. The apparatus of claim 11 wherein said resilient means includes a plurality of axial flexure rods for flexing axially and a radial flexure plate for flexing axially coupled to said axial flexure plate.

16. The apparatus of claim 11 wherein said bumper bearing means includes an axial bumper bearing for resisting axial impact and a radial bumper bearing for resisting radial impact.

* * * * *